United States Patent
Sakazaki

(10) Patent No.: US 6,851,502 B2
(45) Date of Patent: Feb. 8, 2005

(54) DIFFERENTIAL MECHANISM FOR A VEHICLE

(75) Inventor: Akihiko Sakazaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 117 days.

(21) Appl. No.: 10/323,848

(22) Filed: Dec. 20, 2002

(65) Prior Publication Data

US 2003/0116371 A1 Jun. 26, 2003

(30) Foreign Application Priority Data

Dec. 25, 2001 (JP) ..................................... P.2001-392169

(51) Int. Cl.[7] .............................................. B60K 17/344
(52) U.S. Cl. ..................................... 180/248; 180/65.6
(58) Field of Search ............................... 180/65.6, 65.7, 180/242, 243, 248, 249, 250; 475/2, 5, 6, 9

(56) References Cited

U.S. PATENT DOCUMENTS

| | | | | |
|---|---|---|---|---|
| 4,854,413 A | * | 8/1989 | Kameda et al. ............. | 180/247 |
| 5,105,903 A | * | 4/1992 | Buschmann ................ | 180/249 |
| 5,164,903 A | * | 11/1992 | Lin et al. ...................... | 701/89 |
| 5,740,877 A | * | 4/1998 | Sasaki .......................... | 180/248 |
| 5,803,197 A | * | 9/1998 | Hara et al. ................... | 180/248 |
| 6,435,296 B1 | * | 8/2002 | Arai ............................ | 180/243 |
| 6,540,035 B2 | * | 4/2003 | Nagano et al. ............. | 180/65.2 |
| 6,615,946 B2 | * | 9/2003 | Pasquini et al. ............ | 180/248 |
| 6,648,785 B2 | * | 11/2003 | Porter ........................... | 475/5 |

* cited by examiner

Primary Examiner—Christopher P. Ellis
Assistant Examiner—Kelly E Campbell
(74) Attorney, Agent, or Firm—McGinn & Gibb, PLLC

(57) ABSTRACT

A differential mechanism for a vehicle has: a differential for transferring a rotational drive force of an input shaft to two output shafts; an input generator motor for generating electric power using a rotational drive force of the input shaft and/or applying the rotational drive force to the input shaft using electric power supplied thereto; an output generator motor for generating electric power and applying a rotational drive force to the one of the output shafts; and connecting means for electrically connecting the input side generator motor with the output generator motor; switching control unit for switching between an output drive force control for supplying electric power generated by the input generator motor to the output generator motor and the input drive force application control for supplying electric power generated by the output generator motor to the input generator motor.

12 Claims, 4 Drawing Sheets

DIFFERENTIAL MECHANISM FOR A VEHICLE

BACKGROUND OF THE INVENTION

1. Field of the Invention

The present invention relates to a differential mechanism for a vehicle, particularly to a 4WD vehicle with two auxiliary assist motors.

2. Description of the Related Art

In general, a differential is provided on a four-wheel drive (4WD) vehicle for splitting (dividing or distributing)and transferring a drive force of an engine to front and rear wheels. The differential has an input shaft to which a rotational drive force from the engine is transferred and output shafts to which the rotational drive force of the input shaft is transferred and which are allowed to rotate at different speeds. This provision of the differential allows the front and rear wheels to turn at the different speeds even if there occurs a difference in a turning speed between the front and rear wheels when the vehicle goes round a bend (corner), whereby the vehicle is allowed to run smoothly round the bend.

In recent years, 4WD vehicles are known in which the torque split (distribution) between front and rear wheels is controlled. According to a differential mechanism of the 4WD vehicles of this type, in addition to the differential described above, an oil pump adapted to be driven by the engine is provided to control a plurality of clutches by hydraulic pressure obtained from the oil pump so as to change the rotational driving force transferred to the respective output shafts, whereby a desired torque split can be realized.

With the aforementioned differential mechanism, however, the control of the plurality of the clutches through the hydraulic pressure causes a problem that not only a structure of the differential mechanism but also the torque split control are made complicated. In addition, on top of the complicated structure, there is also caused a problem with securing a sufficient level of reliability due to leakage and deterioration of oil used.

SUMMARY OF THE INVENTION

The present invention was made in view of these situations, and an object thereof is to provide a differential mechanism for a vehicle which can control a torque split and secure a sufficient level of reliability.

With a view to achieving the object, according to a first aspect of the present invention, there is provided a differential mechanism for a vehicle having: the differential for transferring a rotational drive force of an input shaft to two output shafts so as to permit a difference in a rotating speed between the two output shafts, the input shaft connected to a power source; an input generator motor for generating an electric power by using a rotational drive force of the input shaft and/or applying a rotational drive force to the input shaft using electric power supplied thereto; an output generator motor for generating by electric power by using the rotational drive force of one of the output shafts and applying the rotational drive force to the one of the output shafts using the electric power supplied thereto; and connecting means for electrically connecting the input generator motor with the output side generator motor; a switching control unit for switching between an output control for supplying the electric power generated by the input generator motor to the output generator motor and an input control for supplying the electric power generated by the output side generator motor to the input generator motor.

It is preferable that the differential mechanism for the vehicle as set forth in the first aspect, wherein the power source is an internal combustion engine.

It is preferable that the differential mechanism for the vehicle as set forth in the first aspect, wherein the input generator motor comprises a rotator provided integrally with a main case body of the differential, and a stator disposed around the main case body of the differential.

According to the structure of the first aspect of the present invention, in a case where a torque split to one of the output shaft is attempted to be increased higher than the torque split ratio between the output shafts which is set by the differential, the control switches in such a way that the output drive force control is implemented, so that the rotational drive force is applied to the one of the output shafts by the output generator motor. In contrast, in the case where the torque split to the one of the output shafts is attempted to be decreased below the torque split ratio set by the differential, the control means switches in such a way that the input drive force control is implemented, so that the rotational drive force of the one of the output shafts is absorbed by the output generator motor.

In addition, in the event that the vehicle is stuck with the other output shat spinning, the control means switches in such the way that the output drive force control is effected so that the rotational drive force is applied to the one of the output shafts by the output generator motor, whereby the rotation at different speeds of the output shafts of the differential is limited, so that the one of the output shafts is caused to rotate to enable the vehicle to get out of the stuck condition.

Furthermore, in the event that the vehicle is stuck with the one of the output shafts spinning, the control means switches in such a way that the input drive force application control is effected so that the rotational drive force is applied to the other output shaft by absorbing the rotational drive force of the one of the output shafts by the output generator motor, whereby the rotation at the different speeds of the output shafts of the differential is limited, so that the other output shaft is caused to rotate to enable the vehicle to get out of the stuck condition.

Consequently, since the torque split can be implemented through the electric power by using the input generator motor and the output generator motor, the torque split control can be facilitated and furthermore, a sufficient level of reliability can be secured when compared with the differential mechanism for the vehicle in which the torque split is implemented through, for example, a hydraulic pressure.

In addition, since the electric power generated by the rotational drive force of one of the input shaft and the one of the output shafts of the differential is designed to be supplied for use in the application of the rotational drive force to the other, the rotational drive force of the engine can effectively be used.

Additionally, in case either of the respective output shafts is racing, since the differential action of the differential is designed to be limited, a necessity can be obviated of separately providing a mechanism for limiting such a motion of the differential, which can provide a large advantage in practical use.

According to a second aspect of the present invention, there is provided the differential mechanism for the vehicle as set forth in the first aspect, wherein the power source comprises an electric power supply unit and the input generator motor, the input generator motor applies a rotational drive force to the input shaft by using the electric power supplied of the electric power supply unit, and wherein the output generator motor is connected to the electric power supply unit, the control unit switches between the output drive force control for supplying the electric power from the electric power supply unit to the output generator motor and the input drive force control for supplying the electric power generated by the output generator motor to the input generator motor.

It is preferable that the differential mechanism for the vehicle as set forth in the first or second asepct, wherein the output generator motor is provided along a front output shaft of the two output shafts.

It is preferable that the vehicle comprising the differential mechanism asset forth in the first or second aspect.

According to the structure of the second aspect of the present invention, in the case where the torque split to one of the output shaft is attempted to be increased higher than the torque split ratio between the output shafts which is set by the differential, the control means switches in such the way that the output drive force control is implemented, so that the rotational drive force is applied to the one of the output shafts by the output generator motor. In contrast, in a case where the torque split to the one of the output shafts is attempted to be decreased below the torque split ratio set by the differential, the control means switches in such the way that the input drive force application control is implemented, so that the rotational drive force of the one of the output shafts is absorbed by the output side generator motor.

In addition, in the event that the vehicle is stuck with the other output shat racing, the control means switches in such the way that the output drive force control is effected so that the rotational drive force is applied to the one of the output shafts by the output generator motor, whereby the rotation at the different speeds of the output shafts of the differential is limited, so that the one of the output shafts is caused to rotate to enable the vehicle to get out of the stuck condition.

Furthermore, in the event that the vehicle is stuck with the one of the output shafts racing, the control means switches in such the way that the input drive force control is effected so that the rotational drive force is applied to the other output shaft by absorbing the rotational drive force of the one of the output shafts by the output generator motor, whereby the rotation at the different speeds of the output shafts of the differential is limited, so that the other output shaft is caused to rotate to enable the vehicle to get out of the stuck condition.

Consequently, since the torque split can be implemented through the electric power by using the electric motor and the output generator motor, the torque split control can be facilitated and furthermore, the sufficient level of the reliability can be secured when compared with the differential mechanism for the vehicle in which the torque split is implemented through, for example, the hydraulic pressure.

In addition, since the electric power generated by the rotational drive force of the one of the output shafts of the differential is designed to be supplied for use in the application of the rotational drive force by the electric motor, the rotational drive force of the electric motor can effectively be used.

Additionally, in case either of the respective output shafts races, since the differential action of the differential is designed to be limited, the necessity can be obviated of separately providing the mechanism for limiting such an action of the differential.

DETAILED DESCRIPTION OF THE PREFERRED EMBODIMENTS

Figure 1:
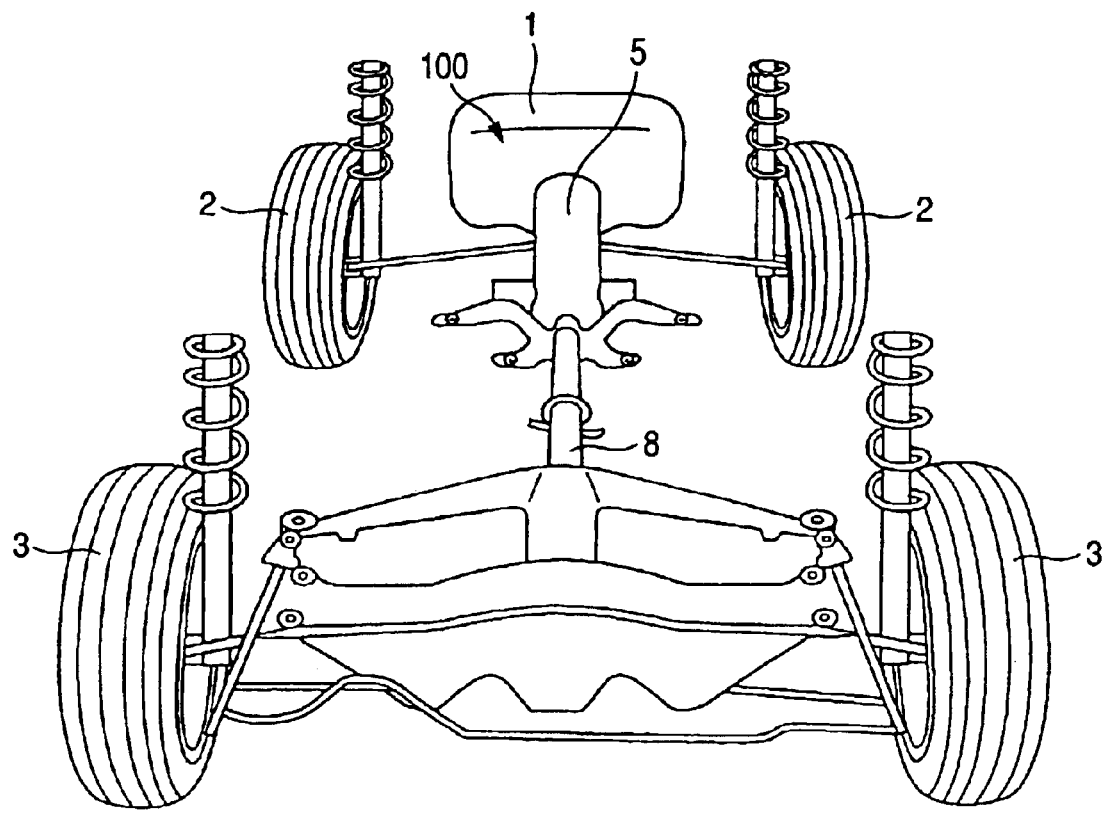
FIG. 1 is a schematic drawing showing a drive line for a vehicle, which illustrates a first embodiment of the present invention.
Figure 2:
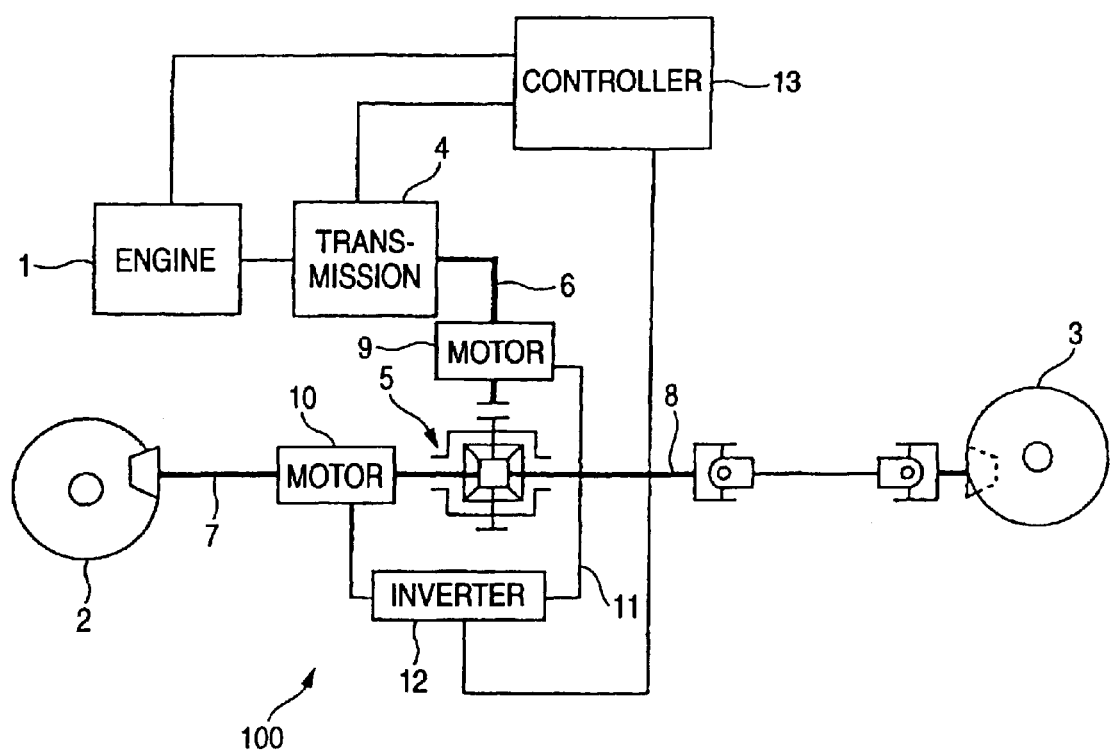
FIG. 2 is a schematic diagram showing a differential mechanism for the vehicle.

FIGS. 1 and 2 show a first embodiment of the present invention, in which FIG. 1 is a schematic drawing showing a drive line for a vehicle and FIG. 2 is a schematic diagram showing a differential mechanism for the vehicle.

The vehicle is a so-called four-wheel drive (4WD) vehicle, and has, as shown in FIGS. 1 and 2, an engine 1 as a power source, and a drive force of the engine 1 is split (distributed) and transferred to front wheels 2 and rear wheels 3. The drive force of the engine 1 is carried (transmitted) to an input shaft 6 of a differential 5 via a transmission 4. In this embodiment, the differential 5 has a front output shaft 7 for transferring the rotational drive force to the front wheels 2 and a rear output shaft 8 for transferring the drive force to the rear wheels 3, and the respective output shafts 7, 8 are structured so as to rotate at different speeds. Namely, a differential mechanism 100 of the 4WD vehicle has the differential 5 comprising the input shaft 6 and the respective output shafts 7, 8.

As shown in FIG. 2, the differential mechanism 100 has an input generator motor 9 provided on the input shaft side, an output generator motor 10 provided the output shaft side and a power line 11 for electrically connecting the input generator motor 9 with the output generator motor 10.

The input generator motor 9 is designed to generate an electric power by using the rotational drive force of the input shaft 6 and to apply the drive force to the input shaft 6 by using the electric power supplied from the output side generator motor 10 via the electric power line. Here, in generating the electric power by using the drive force of the input shaft 6, the rotational force of the input shaft is absorbed and the electric power so generated is then supplied to the output generator motor 10 via the power line 11. Note that since the output generator motor 10 is identical in the structure to the input generator motor. 9, the description of the structure thereof will be omitted.

The input generator motor 9 and the output generator motor 10 are structure so as to give and take the electric power therebetween via the power line 11 which function as electrically connecting means. An inverter 12 is provided along the power line 11, and the electric power obtained from one of the generator motors 9, 10 is prepared by the inverter 12 for use by the other of the generator motors 9, 10 so as to be supplied to the other of the generator motors 9, 10 thereafter.

In addition, the differential mechanism 100 has a control 13 connected both to the input generator motor 9 and the output generator motor 10 for controlling the torque split between the front output shaft 7 and the rear output shaft 8. The control unit 13, which functions as a switching control unit, switches between an output drive force control for supplying the electric power generated by the input generator motor 9 to the output generator motor 10 and an input drive force control for supplying the electric power generated by the output generator motor 10 to the input generator motor 9. Namely, in the output drive force control, the input generator motor 9 is made to function as a generator so as to generate the electric power, whereas the output generator motor 10 is made to function as a motor so as to apply the rotational drive force to the output shaft 7. In contrast, in the input drive force control, the output generator motor 10 is made to function as the generator so as to generate the electric power, whereas the input generator motor 9 is made to function as the motor so as to apply the rotational drive force to the input shaft 6. In addition, the control unit 13 is connected to the engine 1, the transmission 2 or the like, whereby the torque split control can be implemented according to running conditions of the vehicle which are detected through the connection of the control device 13 to those components 1, 2.

Described below will be the function of the control unit 13 of the differential mechanism for the vehicle 100 described heretofore. In the differential mechanism 100, when a torque is attempted to be split between the front wheels 2 and the rear wheels 3, the torque split is implemented by applying a rotational drive force to the front output shaft 7 or absorbing the rotational drive force of the front output shaft 7 by the output generator motor 10.

Namely, in a case where the torque split to the front output shaft 7 is increased to a higher value than that of the torque split ratio between the respective output shafts 7, 8 that is set by the differential 5, the control unit 13 switches such that the output drive force is implemented so that a rotational drive force is applied to the front output shaft 7. In contrast, in the case where the torque split to the front output shaft 7 is decreased, the control part 13 switches such that the input drive force control is implemented so that the rotational drive force of the front output shaft 7 is absorbed by the input generator motor 9.

Here, in the case where the vehicle is stuck with the rear wheels 3 racing, since the respective output shafts 7, 8 are allowed to rotate at the different speeds, only the rear output shaft 8 turns but the front output shaft 7 does not. As this occurs, the control unit 13 switches in such the way that the output drive force control is implemented so that a rotational drive force is applied to the front output shaft 7 by the output generator motor 10, whereby the rotation at the different speeds of the output shafts 7, 8 of the differential 5 is limited and the front wheels 2 are caused to turn, thereby allowing the vehicle to get out of the stuck condition.

In contrast, in case the vehicle is stuck with the front wheels 2 racing, only the front output shaft 7 turns and the rear output shaft 8 does not. As this occurs, the control unit 13 switches in such the way that the input drive force control is implemented so that the rotational drive force of the front output shaft 7 is absorbed by the output generator motor 10, whereby a rotational force is applied to the rear output shaft 8. Namely, the rotation at the different speeds of the respective output shafts 7, 8 is limited so that the respective rear wheels 3 are caused to rotate, allowing the vehicle to get out of the stuck condition. As this occurs, the rotational force is applied to the input shaft 6 by the input generator motor 9, and an energy produced by the racing front output shaft 7 is supplied for driving the input shaft 6.

Thus, according to the differential mechanism for the vehicle 100 according to the embodiment, since the torque split is performed to be implemented through the electric power by using the respective generator motors 9, 10, the torque split control can be facilitated and furthermore, the sufficient level of the reliability can be secured when compared with the conventional differential mechanism for the vehicle in which the torque split is implemented hydraulically. In other words, in a case of trying to implement the torque split by using the hydraulic pressure, the oil pump and clutches are required to control the hydraulic pressure, therefore not only the mechanism is made complicated and larger but also the fuel economy of the engine 1 is deteriorated due to driving the oil pump. On the contrary to this, with the differential for the vehicle according to the embodiment, since the generator motors 9, 10 are only provided on the input shaft 6 and the front output shaft 7, respectively the structure of the mechanism becomes simple. In addition, since one of the generator motors 9, 10 is adapted to function as the generator so as to supply the electric power to the other of the generator motors 9, 10, there is no risk that the fuel economy of the engine 1 is deteriorated due to the torque split control.

In addition, according to the differential mechanism for the vehicle 100 according to the embodiment, since the generator motors 9, 10 for applying and absorbing the rotational drive force are provided on the input side and output side of the differential 5, respectively. The electric power generated through the rotational drive force of one of the input shaft 6 and the front output shaft 7 is designed to be supplied for application to the other. The rotational drive force of the engine 1 can effectively be used, and providing an advantage for improving a fuel economy performance of the engine 1.

In addition, according to the differential mechanism for the vehicle 100 of the embodiment, since the output generator motor 10 is provided along the front output shaft 7, in the case of the front engine vehicle which mounts the engine in a front portion thereof, the output generator motor 10 can be installed in, for example, an engine compartment. Therefore, a space for the installation of the output generator motor 10 can be secured relatively easily, and providing an advantage in a vehicle design. Namely, in case where the output generator motor 10 is disposed along the rear output shaft 8, a larger recessed portion (a tunnel portion) needs to be formed on a floor panel of the vehicle, leading to a risk that a wide space may not be able to be secured within a passenger compartment.

Additionally, according to the differential mechanism for the vehicle 100 of the embodiment, in case the front wheels 2 or the rear wheels 3 races, since the differential action of the differential 5 is designed to be limited, when stuck, the vehicle can attempt to get out of the stuck condition. With the differential mechanism for the vehicle according to the embodiment, there is no need to separately provide the mechanism for limiting such a differential action of the differential, and therefore, an extreme advantage can be provided in practical use.

Note that while the differential mechanism for the vehicle is described as being applied to the internal combustion engined vehicle having only the engine 1 as the power source in the first embodiment, the mechanism may be applied to a hybrid vehicle having in parallel an internal combustion engine and an electric motor as the power sources. In this case, the generation and application of the rotational drive force on the input shaft side are carried out by the electric motor.

In addition, while the present invention is described as being applied to the differential 5 for splitting and transferring the rotational drive force of the engine 1 between the front wheels 2 and the rear wheels 3 of the vehicle in the first embodiment, the present invention may naturally be applied to the differential mechanism for splitting and transferring the rotational drive force to the left and right front or rear wheels of the vehicle.

Figure 3:
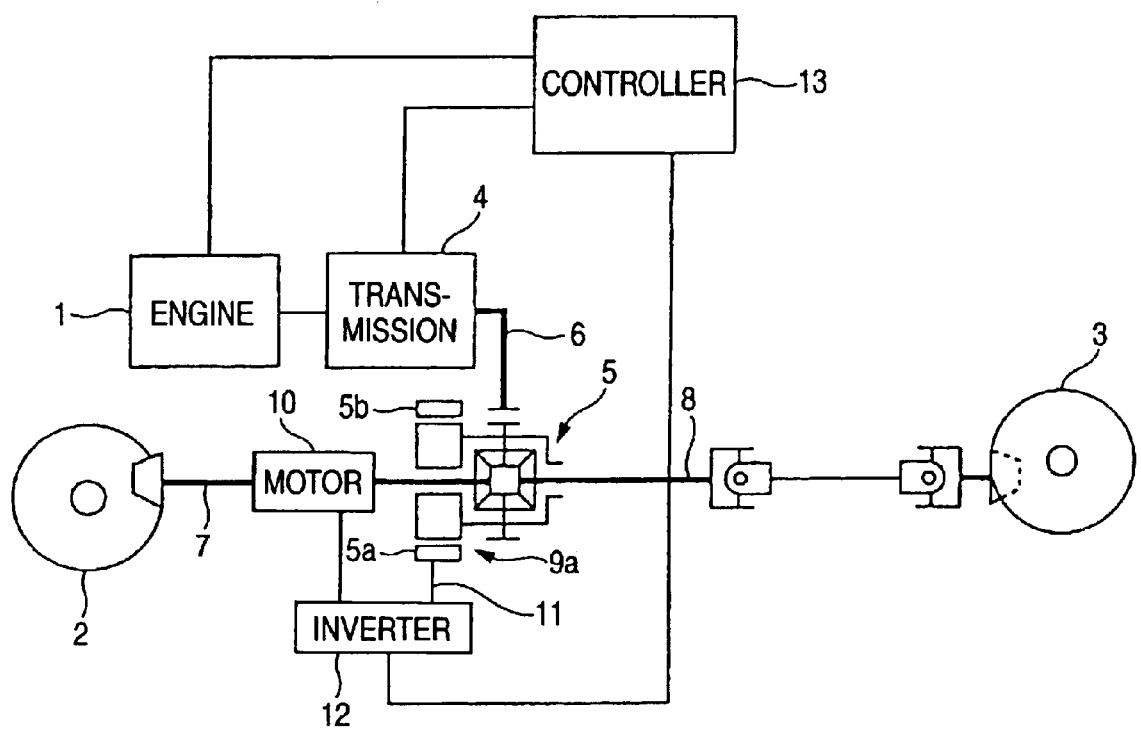
FIG. 3 is a schematic diagram showing a modification made to the differential mechanism of the first embodiment.

Furthermore, while the input generator motor 9 is described as being disposed on the input shaft 6 in the first embodiment, as shown in FIG. 3, for example, the input generator motor 9a may have a rotator 5a which is provided integrally with a main case body of the differential 5, and a stator 5b disposed around the main case body of the differential 5. Here, the rotator 5a which is made integral with the main case body is such as to rotate in such a manner as to be interlocked with the input shaft 6, and the rotational drive force is designed to be transferred from the differential 5 to the respective output shafts 7, 8. With this structure, too, the similar function and effectiveness similar to those provided by the first embodiment can be obtained. Namely, any structure may be adopted provided that the generator motor is provided on the input side of the differential 5.

Figure 4:
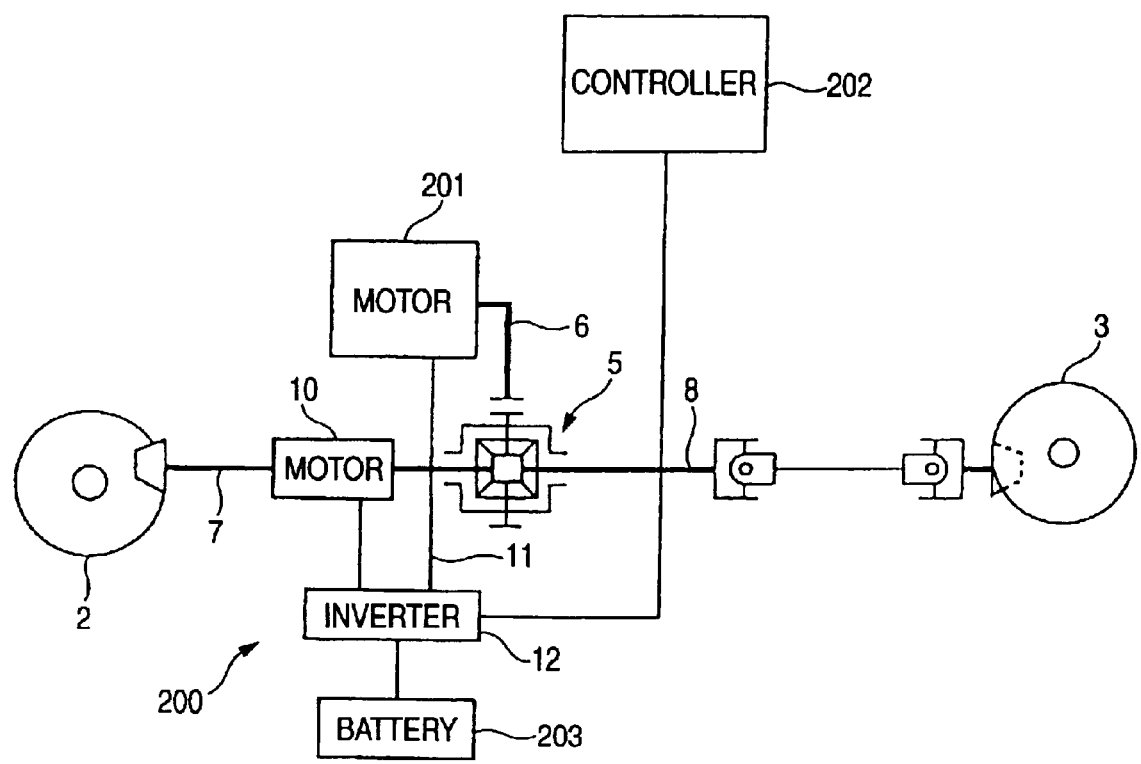
FIG. 4 is the schematic diagram showing the differential mechanism for the vehicle, which illustrates a second embodiment of the present invention.

FIG. 4 shows a second embodiment of the present invention and is a schematic diagram showing of the differential mechanism of another type of the vehicle. The second embodiment will be described with the same reference numerals to those used in the first embodiment being applied to similar components like to those described in the first embodiment.

This vehicle is a so-called an electric vehicle, and has, as shown in FIG. 4, an electric motor 201 as the prime mover, and the drive force of the electric motor 201 is split and transferred to the front wheels 2 and the rear wheels 3. The electric motor 201 is connected to an inverter 12 via a controller 202 and the drive force of the electric motor 201 is controlled by the controler 202 for transferring the force to the input shaft 6 of the differential 5. In this embodiment, too, the differential 5 has the front output shaft 7 for transferring the rotational drive force to the front wheels 2 and the rear output shaft 8 for transferring the rotational drive force to the rear wheels 3 and is structured in such the way that the respective output shafts 7, 8 are allowed to turn at the different speeds. Namely, the differential mechanism for a vehicle 100 has the differential 5 having in turn the input shaft 6 and the respective output shafts 7, 8.

As shown in FIG. 4, the differential mechanism 200 has the electric motor 201 provided on the input shaft 6 side as an electric mover (the power source comprising an electric power supply unit and the input side generator motor), an output generator motor 10 provided on the front output shaft 7 and an electric power connecting line 11 for electrically connecting the electric motor 201 with the output generator motor 10.

The electric motor 201 and the output generator motor 10 are connected to each other via the electric power connecting line 11 such that the electric power can be given and taken therebetween. An inverter 12 is provided along the electric power connecting line 11 and is connected to a battery 203 of the vehicle. Namely, in this embodiment, the power of the battery 203 is designed to be supplied to the electric motor 201 and the output generator motor 10 via the inveter 12.

The electric motor 201 is a primary motor for use while the vehicle is running and applies a rotational drive force to the input shaft 6 for using the electric power supplied from the battery 203 which functions as an electric power supply unit. The controller 202 controls to drive the electric motor 201 via the inverter 12 by stepping on an accelerator or by controlling, the vehicle speed and the like. In addition, the controller 202 is connected to the output generator motor 10 via the inverter 12 so as to control the torque split between the front output shaft 7 and the rear output shaft 8, as well.

The controller 202 switches between an output drive force control for supplying the electric power supplied from the battery 203 to the output generator motor 10 and an input drive force application control for supplying the electric power generated by the output generator motor 10 to the electric motor 201. In other words, in the output drive control, the output generator motor 10 is made to function as a motor in such manner that the rotational drive force is applied to the front output shaft 7. In addition, in the input drive force control, the output generator motor 10 is made to function as a generator for generating the electric power, and the rotational drive force is applied to the input shaft 6 by the electric motor 201.

With the differential mechanism 200 for the vehicle structured as has been described heretofore, similarly to the first embodiment, the torque split and differential limiting controls are implemented by allowing the controller 202 to switch between the output drive force control and the input drive force control.

Thus, according to the differential mechanism 200 for the vehicle of the embodiment, since the torque split is designed to be implemented through the electric power by using the electric motor 201 and the output generator motor 10, the torque split control can be facilitated. Furthermore, a sufficient level of reliability can be secured when compared with, for example, the conventional differential mechanism for the vehicle in which the torque split control is hydraulically implemented.

In addition, according to the differential mechanism 200 for the vehicle of the embodiment, in the electric vehicle having the electric motor 201, since the output generator motor 10 which is connected to the electric motor 201 is provided on the front output shaft 7, the torque split control between the front output shaft 7 and the rear output shaft 8 and the differential limit control of the respective output shafts 7, 8 can be implemented. With the differential mechanism 200 for the vehicle according to the second embodiment, there is no need to separately provide a generator motor or the like on the input shaft 6 side of the differential 5, and therefore, the torque split and differential limit controls can be implemented with the simple structure, and providing an extreme advantage in practical use.

Additionally, according to the differential mechanism 200 for the vehicle of the embodiment, since the electric power generated by the rotational drive force of the front output shaft 7 is designed to be supplied for use in applying the rotational drive force to the input shaft 6, the rotational drive force of the electric motor 201 can effectively used, and providing the advantage in decreasing the power consumption of the electric motor 201.

Furthermore, according to the differential mechanism 200 for the vehicle of the embodiment, since the output generator motor 10 is provided along the front output shaft 7, in the case of the front engine vehicle which mounts the engine in a front portion thereof, the output generator motor 10 can be installed in, for example, the engine compartment. Therefore, the space for the installation of the output generator motor 10 can be secured relatively easily, and providing the advantage in the vehicle design.

Note that while the present invention is described as being applied to the electric vehicle having the electric motor 201 as the power source in the second embodiment, the present invention may be applied to a hybrid vehicle having in parallel the internal combustion engine and in parallel with the electric motor. In this case, the electric motor is so structured as to be supplied with the electric power from the battery.

In addition, while the present invention is described as being applied to the differential 5 for splitting and transferring the rotational drive force of the electric motor 201 between the front wheels 2 and rear wheels 3 of the vehicle in the second embodiment, the present invention may naturally be applied to the differential mechanism for splitting and transferring the rotational drive force to the left and right front or rear wheels of the vehicle.

Additionally, while the output generator motor 10 is described as being provided on the front output shaft 7 side both in the first and second embodiments, even if the differential mechanism for the vehicle is structured such that the output generator motor 10 is provided on the rear output shaft 8 side, the torque split control and differential limit control can be implemented as well. Moreover, other specific detailed structures of the differential mechanism for the vehicles may suitably be modified.

As has been described in detail heretofore, according to the differential mechanism for the vehicles of the present invention, since the torque split is designed to be implemented by the electric power, the torque split control can be facilitated and furthermore, the sufficient level of the reliability can be secured when compared with, for example, the conventional differential mechanism in which the torque split is implemented hydraulically.

The disclosure of Japanese Patent Application No. 2001-392169 filed on Dec. 25, 2001 including the specification, drawings and abstract is incorporated herein by reference in its entirety.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. A differential mechanism for a vehicle comprising:
   a differential for transferring a rotational drive force of an input shaft to two output shafts so as to permit a difference in a rotating speed between the two output shafts, the input shaft being connected to a power source;
   an input generator motor for generating an electric power by using a rotational drive force of the input shaft and/or applying a rotational drive force to the input shaft by using the electric power supplied thereto;
   an output generator motor for generating the electric power by using the rotational drive force of one of the output shafts and applying the rotational drive force to the one of the output shafts by using electric power supplied thereto;
   connecting means for electrically connecting the input generator motor with the output generator motor; and,
   a switching control unit for switching between an output drive force control for supplying the electric power generated by the input generator motor to the output generator motor and an input drive force control for supplying the electric power generated by the output generator motor to the input generator motor.

2. The differential mechanism for the vehicle as set forth in claim 1, wherein the power source is an internal combustion engine.

3. The differential mechanism for the vehicle as set forth in claim 2, wherein the input generator motor comprises a rotator provided integrally with a main case body of the differential, and a stator disposed around the case of the differential.

4. The differential mechanism for the vehicle as set forth in claim 3, wherein the output generator motor is provided along a front output shaft of the two output shafts.

5. The differential mechanism for the vehicle as set forth in claim 2, wherein the output generator motor is provided along a front output shaft of the two output shafts.

6. The differential mechanism for the vehicle as set forth in claim 1, wherein the input generator motor comprises a rotator provided integrally with a main case body of the differential, and a stator disposed around the case of the differential.

7. The differential mechanism for the vehicle as set forth in claim 6, wherein the output generator motor is provided along a front output shaft of the two output shafts.

8. The differential mechanism for the vehicle as set forth in claim 1, wherein the power source comprises an electric power supply unit and the input generator motor, the input generator motor applying the rotational drive force to the input shaft by using the electric power supplied from the electric power supply unit,
   wherein the output generator motor is connected to the electric power supply unit, and
   wherein the switching control unit switches between an output drive force control for supplying the electric power from the electric power supply unit to the output generator motor and an input drive force control for supplying the electric power generated by the output generator motor to the input generator motor.

9. The differential mechanism for the vehicle as set forth in claim 8, wherein the output generator motor is provided along a front output shaft of the two output shafts.

10. A vehicle comprising the differential mechanism as set forth in claim 8.

11. The differential mechanism for the vehicle as set forth in claim 1, wherein the output generator motor is provided along a front output shaft of the two output shafts.

12. A vehicle comprising the differential mechanism as set forth in claim 1.

* * * * *